(12) United States Patent
Park (10) Patent No.: US 6,668,950 B2
(45) Date of Patent: Dec. 30, 2003

(54) OMNI-DIRECTIONAL MUNITIONS HANDLING VEHICLE

(76) Inventor: Andrew D. Park, 2851 E. Brigstock Rd., Midlothian, VA (US) 23113

( * ) Notice: Subject to any disclaimer, the term of this patent is extended or adjusted under 35 U.S.C. 154(b) by 0 days.

(21) Appl. No.: 10/142,215

(22) Filed: May 9, 2002

(65) Prior Publication Data

US 2003/0221878 A1 Dec. 4, 2003

(51) Int. Cl.[7] .......................... B62D 11/04; B62D 57/00
(52) U.S. Cl. .......................... 180/7.1; 180/20; 414/495; 254/10 R
(58) Field of Search ........................... 180/7.1, 7.2, 20; 414/495, 917; 254/10 R, 10 B, 10 C (56) References Cited

U.S. PATENT DOCUMENTS

| | | | |
|---|---|---|---|
| 3,746,112 A | 7/1973 | Ilon | |
| 3,789,947 A | 2/1974 | Blumrich | |
| 3,876,255 A | 4/1975 | Ilon | |
| 4,715,460 A | 12/1987 | Smith | |
| 5,701,966 A | 12/1997 | Amico | |
| 6,134,734 A | * 10/2000 | Marrero | 15/53.1 |
| 6,340,065 B1 | 1/2002 | Harris | |
| 6,394,203 B1 | 5/2002 | Harris | |
| 6,477,730 B1 | 11/2002 | Marrero | |

OTHER PUBLICATIONS

Armed Forces Journal International; "Elbow Room"; pp. 60–61; Dec., 2000.

* cited by examiner

*Primary Examiner*—Kevin Hurley
(74) *Attorney, Agent, or Firm*—Schwartz Law Firm, P.C.

(57) ABSTRACT

A munitions handling vehicle is adapted for loading and unloading weapons in military aircraft. The munitions handling vehicle includes a vehicle chassis and a plurality of wheel axles attached to the chassis. A plurality of omni wheels are mounted on respective wheel axles, and cooperate to induce omni-directional movement of the vehicle. A mechanical lift is supported by the vehicle chassis. A munitions carrier is secured to a top end of the lift, and is movable upon actuation of the lift between a weapons-transport position and an aircraft-access position. In the weapons-transport position, the lift is sufficiently retracted adjacent the vehicle chassis to facilitate transport of weapons in the carrier to and from the aircraft. In the aircraft-access position, the lift is sufficiently extended to enable precision loading and unloading of weapons in the aircraft without repositioning or reconfiguring the aircraft.

20 Claims, 9 Drawing Sheets

OMNI-DIRECTIONAL MUNITIONS HANDLING VEHICLE

TECHNICAL FIELD AND BACKGROUND OF INVENTION

This application relates to an omni directional munitions handling vehicle. The invention is especially applicable for munitions loading of military aircraft, such as F-15, F-16 and F-22 fighters and B-1, B-2 and B-52 bombers. The invention utilizes omni-directional vehicle (ODV) technology to promote maneuverability around and beneath aircraft.

Originally patented in 1973 by the Swedish inventor Bengt Ilon, the omni wheel and its operating principle is described U.S. Pat. No. 3,746,112 entitled "Directionally Stable Self Propelled Vehicle." The complete disclosure of this patent is incorporated herein by reference. The ODV has a four wheel drive system where each of the wheels has its own drive motor. Omni wheels are not steered as the plane of rotation is fixed in reference to the chassis. The omni-directional wheel allows the vehicle to travel in any direction, rotate about its axis, or to do both simultaneously. The ability to maneuver in any direction and rotate within the vehicle footprint is a considerable advantage for industrial and commercial vehicles such as forklifts, scissors lifts, wheel chairs, aircraft support and maintenance platforms, motorized dollies, and delivery trucks. Omni-directional mobility is especially useful in material transportation within in a confined area where multi-directional, precision-controlled motion is desired.

U.S. Pat. No. 6,340,065 entitled "Low Vibration Omni-Directional Wheel" describes an omni wheel for an omni-directional vehicle that exhibits constant ride height, low vibration, and reduced maximum ground contact pressure. This omni wheel includes a wheel assembly rotatably connected to an omni-directional vehicle chassis. The wheel assembly comprises a hub on which free spinning rollers are rotatably mounted at an angle to the wheel axis. Constant ride height and low vibration operation are accomplished by configuring the rollers with an exterior profile, thickness, material properties and surface grooving to achieve constant deflection of the roller contact surface at all wheel rotation angles. The complete disclosure of the '065 Patent is also incorporated herein by reference.

Military Application

Since 1982, the United States Navy has been developing ODV technology for shipboard and shore side applications. Five ODV's have been developed and tested ranging in size from a small model to two full-scale vehicles capable of transporting 5,000 pounds onboard Navy ships. Tests of these vehicles indicate that the ODV outperforms existing all-wheel-steered (AWS) vehicles presently employed for warehouse and shipboard materials handling operations by maneuvering with precision and operating under low traction conditions, on steep ramps, and over obstacles. Despite this successful testing, ODVs have not been used in routine military missions. The United States Air Force has also considered ODV technology, but has yet to fully develop and implement its use.

Recently, the United States Air Force issued specifications for a future munitions and bomb handling vehicle. According to the specifications, the vehicle must be versatile and easily maintainable, while offering common munitions handling/loading with increased reliability, maintainability, operability, and functionality to reduce aircraft turnaround time and increase sortie availability. The specification requires an advanced technology handling and loading vehicle which utilizes the latest in technology and human amplification to facilitate loading and unloading of munitions, pylons, tanks, gun systems, launchers, and aircraft components on all current and future fighter (F-22, Joint Strike Fighter (JSF), and the Unmanned Combat Aerial Vehicle (UCAV)), bomber and rotary-wing aircraft or munitions trailers/handling systems. The vehicle requires a self-propelled, manually operated/driven platform with a lift arm enabling precision positioning with minimal manpower through use of platform and lift arm mounted controls. Although the main emphasis is for munitions handling, the vehicle must include interoperability with other aircraft maintenance functions, such as installation/removal of launchers, fuel tanks, electronic counter measure pods, ejection seats, canopies, etc. The vehicle must be operable and maintainable in all environmental conditions, including nuclear, biological, and chemical contaminated conditions. The vehicle requires increased reach over the existing MJ-1 munitions handler/loader to allow loading of bomber aircraft (B-1, B-2, B-52) and the agility to load low aircraft (F-22, UCAV, JSF). In addition, it is envisioned that the new system should substantially reduce the workload associated with aircraft loading, munitions handling and maintenance tasks, allowing safer operation and better utilization of personnel than current systems.

Problems with Existing Systems

Current Air Force systems use three different types of munitions handlers/loaders, and variants, to support their weapons platforms. The logistics infrastructure for maintaining the current inventory of munitions handlers/loaders and their numerous variants is manpower intensive and expensive.

In addition, the design of current munitions handlers/loaders leads to inefficient utilization of load crew personnel. The use of three different variants causes an increased deployment footprint and increases pre-positioning requirements. Moreover, there is a shortage of munitions handlers/loaders in the existing inventory. To compound matters, many of the current munitions handlers are nearing the end of their service life. The existing munitions handlers/loaders are based on 1950's and 60's technology, and are becoming inefficient and obsolete as new munitions and aircraft weapon systems advance technologically. Current limited utility is evident in the loading of the F-22 internal bays. Due to its low ground clearance, existing munitions handlers/loaders are unable to load munitions in internal weapons bays with both doors extended.

The present invention addresses these and other problems of existing military systems. Utilizing omni-directional wheel technology, the invention provides a man onboard, remotely operated, or automatically guided munitions handling/loading vehicle with extremely efficient, unrestricted precision maneuvering capability. The omni wheel is more complex than a conventional wheel and more difficult to fabricate. With exception of the wheel, however, the design and fabrication of the invention is relatively non-complicated. The drive system includes four identical drive units (one for each wheel); the wheels; a simple suspension system; and a power source (battery or diesel engine). The electronics are unsophisticated and compact. The invention provides an overall robust and easily maintained munitions handling/loading system.

SUMMARY OF INVENTION

Therefore, it is an object of the invention to provide an omni-directional vehicle especially applicable for military use in the loading/handling of munitions for aircraft.

It is another object of the invention to provide a munitions handling vehicle which is capable of omni-directional 360-degree maneuverability in a confined 10'×10' area.

It is another object of the invention to provide a munitions handling vehicle which allows more efficient utilization of manpower.

It is another object of the invention to provide a munitions handling vehicle which enables precision control, increased traction and obstacle negotiation.

It is another object of the invention to provide a munitions handling vehicle which features overall mechanical simplicity, and reduced weight and cost as compared to alternative types of highly maneuverable vehicles.

It is another object of the invention to provide a munitions handling vehicle which offers independent control of vehicle motion in the longitudinal, lateral, and rotational directions without the singular characteristics of a conventional wheel.

It is another object of the invention to provide a munitions handling vehicle which eliminates any need for maneuvering back and forth in order to reach a certain point and orientation.

It is another object of the invention to provide a munitions handling vehicle which reduces the space and time required for vehicle movement. While this feature is a significant advantage in all applications, it is especially desirable in space constrained or obstacle intensive environments such as ammunition magazines, and other areas on board Navy ships and under aircraft.

It is another object of the invention to provide a munitions handling vehicle which is capable of precision movement; preferably, not greater than one inch per second in any direction.

It is another object of the invention to provide a munitions handling vehicle which is capable of performing all positioning and handling tasks for munitions weighing up to 7000 pounds.

It is another object of the invention to provide a munitions handling vehicle which has a remote control unit capable of controlling all lift arm functions.

It is another object of the invention to provide a munitions handling vehicle which is capable of travel at variable speeds up to twenty (20) mph with or without a load.

It is another object of the invention to provide a munitions handling vehicle which is capable of travel at speeds up to ten (10) mph while carrying a maximum load.

It is another object of the invention to provide a munitions handling vehicle which is capable of performing a self-test of the major system components during vehicle start-up. As start-up, the vehicle identifies any faulty system components that would cause the it to malfunction during a mission critical task. The test produces a fault code identifying the problem during maintenance troubleshooting.

It is another object of the invention to provide a munitions handling vehicle which is compatible with all existing military and commercial transportation and handling equipment, modes of transport, and holding facilities in all operating environments.

It is another object of the invention to provide a munitions handling vehicle which meets Nuclear Certification requirements.

It is another object of the invention to provide a munitions handling vehicle which provides adequate lighting (forward and rear) for night driving and loading/unloading operations.

It is another object of the invention to provide a munitions handling vehicle which is operable in extreme temperature environments that may be found in desert or arctic regions.

It is another object of the invention to provide an omni wheel vehicle which has application for commercial and industrial use outside of the military.

These and other objects of the present invention are achieved in the preferred embodiments disclosed below by providing a munitions handling vehicle adapted for loading and unloading weapons in military aircraft. The munitions handling vehicle includes a vehicle chassis and a plurality of wheel axles attached to the chassis. A plurality of omni wheels are mounted on respective wheel axles, and cooperate to induce omni-directional movement of the vehicle. A mechanical lift is supported by the vehicle chassis. A munitions carrier is secured to a top end of the lift, and is movable upon actuation of the lift between a weapons-transport position and an aircraft-access position. In the weapons-transport position, the lift is sufficiently retracted adjacent the vehicle chassis to facilitate transport of weapons in the carrier to and from the aircraft. In the aircraft-access position, the lift is sufficiently extended to enable precision loading and unloading of weapons in the aircraft without repositioning or reconfiguring the aircraft.

According to another preferred embodiment of the invention, each of the omni wheels includes a plurality of generally elliptical-shaped rollers.

According to another preferred embodiment of the invention, each of the omni wheels has at least six rollers.

According to another preferred embodiment of the invention, an electric motor is operatively connected to each of the omni wheels for individually actuating the wheels.

According to another preferred embodiment of the invention, each electric motor has a minimum of 5 horsepower.

According to another preferred embodiment of the invention, the mechanical lift is a scissor lift including a plurality of cooperating, interconnected, crossing arms.

According to another preferred embodiment of the invention, the mechanical lift is a foldable stand including a plurality of cooperating, interconnected, folding arms.

According to another preferred embodiment of the invention, the vehicle chassis includes a support platform.

According to another preferred embodiment of the invention, the vehicle defines a profile measured from an uppermost extremity of the vehicle to a ground surface. Preferably, the profile is less than 14 inches when the mechanical lift is fully retracted.

According to another preferred embodiment of the invention, the vehicle defines a maximum reach measured from the munitions carrier to a ground surface. Preferably, the maximum reach is greater than 60 inches when the mechanical lift is fully extended.

According to another preferred embodiment of the invention, the munitions carrier includes an elongated weapons trough adapted for holding weapons in a generally prone position. The term "prone" is defined herein as a lying down position wherein the longitudinal dimension of the weapon extends generally parallel to the ground surface over which the vehicle travels.

In another embodiment, the invention is a method for loading weapons in military aircraft. The method includes the step of transporting a weapon to an aircraft on a munitions handling vehicle. The vehicle includes a plurality of omni wheels cooperating to induce omni-directional movement of the vehicle. With the vehicle located at the aircraft, the weapon is then moved from a weapons-transport position, wherein the vehicle defines a profile of less than 14 inches measured from an uppermost extremity of the vehicle to a ground surface, to an aircraft-access position, wherein the vehicle defines a maximum reach of greater than 60 inches measured from the ground surface. In the aircraft-access position, the weapon is loaded in the aircraft.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
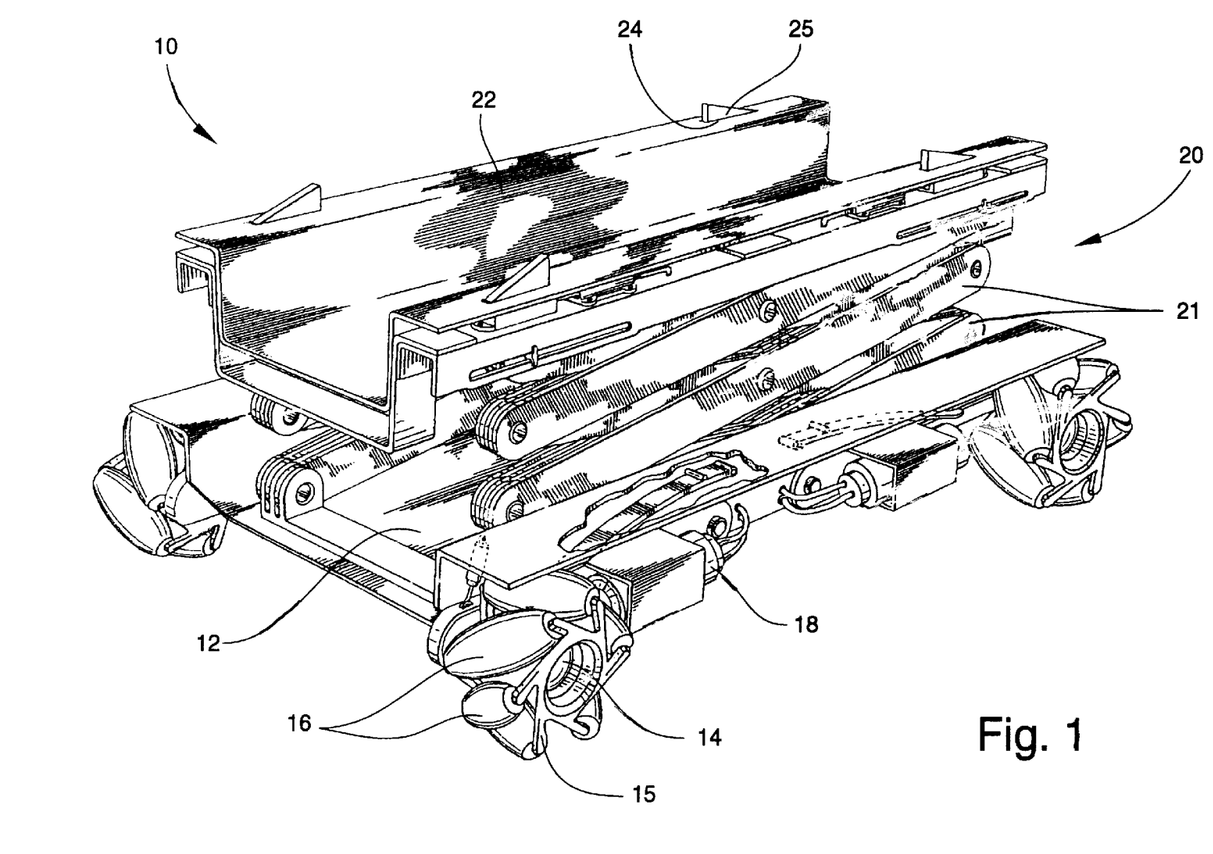
FIG. 1 is a perspective view of a munitions handling vehicle according to one preferred embodiment of the invention.

Referring now specifically to the drawings, a munitions handling vehicle according to the present invention is illustrated in FIG. 1, and shown generally at reference numeral 10. The vehicle 10 utilizes ODV technology to enable precision, omni-directional movement in confined areas around and beneath military aircraft. The term "omni-directional movement" means the ability to move in any direction and rotation, either separately or simultaneously. The vehicle 10 is capable of turning 360 degrees within its own footprint in a 10'×10' area, and traveling at variable speeds up to 20 mph with or without a load, and up to 10 mph while carrying a maximum load. The total weight of the vehicle 10 is preferably less than 5740 pounds.

Figure 2:
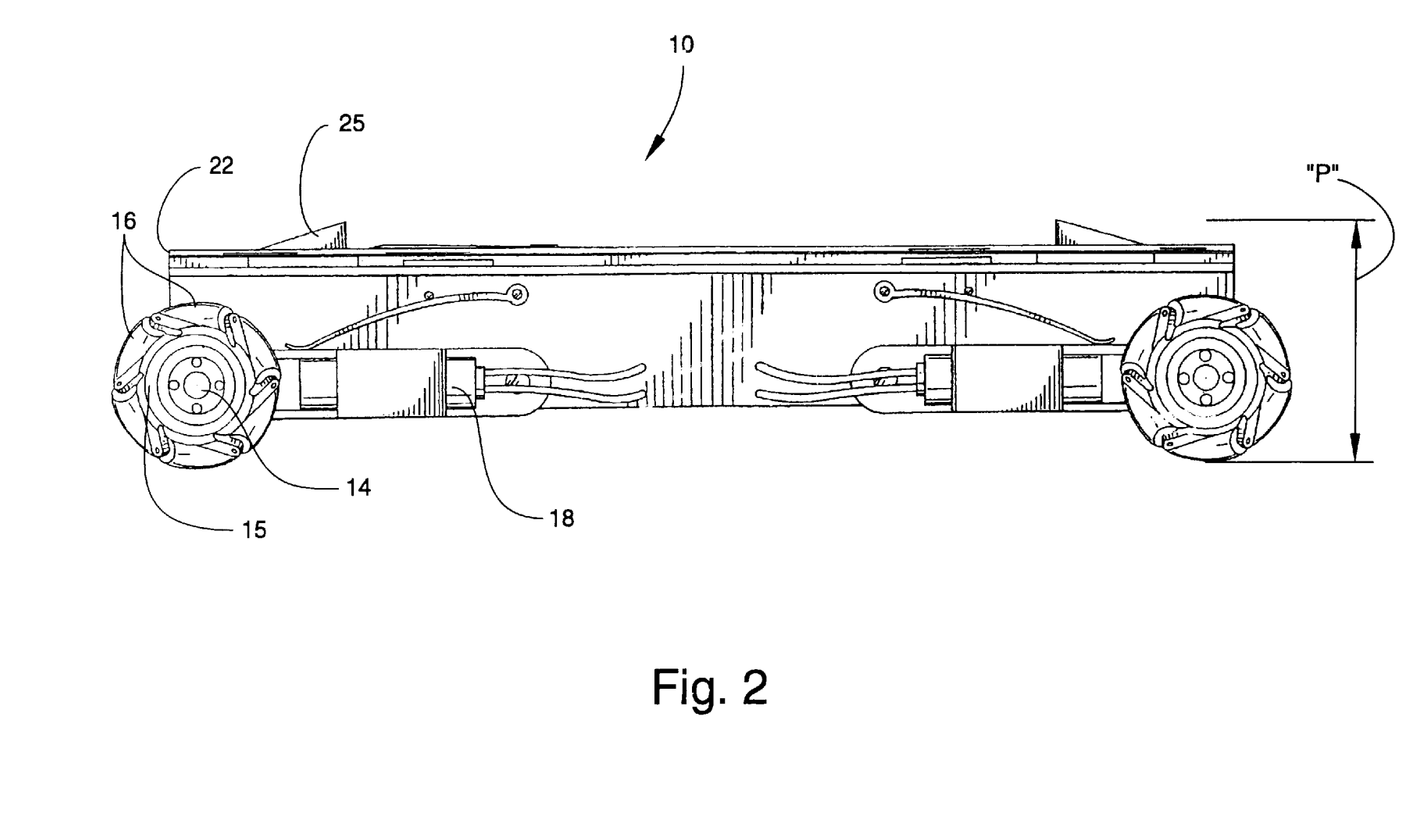
FIG. 2 is a side elevation of the munitions handling vehicle with the munitions carrier in the weapons-transport position.
Figure 3:
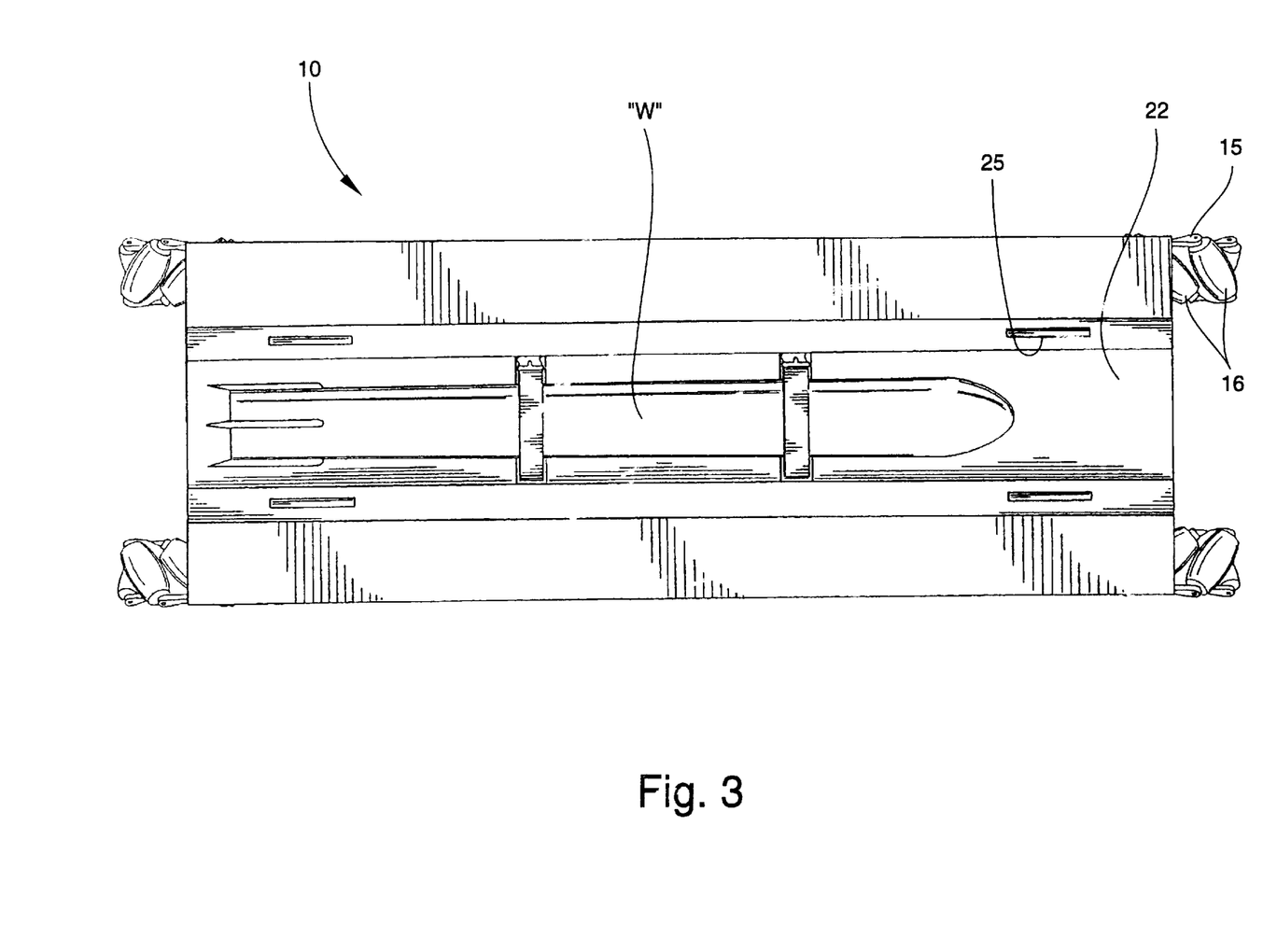
FIG. 3 is a top plan view of the munitions handling vehicle with an aircraft weapon in a prone position within the munitions carrier.

As shown in FIGS. 1–3, the vehicle 10 has a platform chassis 12 and wheel axles 14 carrying respective omni wheels 15. Each omni wheel 15 includes a series of six passive elliptical rollers 16 each mounted at a 45-degree angle to the wheel plane of rotation. The wheel rollers 16 are preferably coated with an elastomeric surface contact material to improve traction, as disclosed in U.S. Pat. Nos. 3,789,947; 3,876,255; and 4,715,460. Four identical, 5-horsepower AC electric motors 18 are operatively connected to respective drive units to enable independent actuation of the omni wheels 15. When a wheel 15 is rotated, the resulting motion tends to move the wheel 15 on the ground at a 45-degree angle to its plane of rotation. By the individual motion created by each wheel 15, the vehicle 10 can move in any desired direction and rotation. Using conventional RF technology, vehicle speed and direction are remote-controlled by a three-axis joystick (not shown). Responding to the joystick, microprocessor-based algorithms control the rate and direction of rotation of each wheel 15 to achieve the desired vehicle motion.

Figure 4:
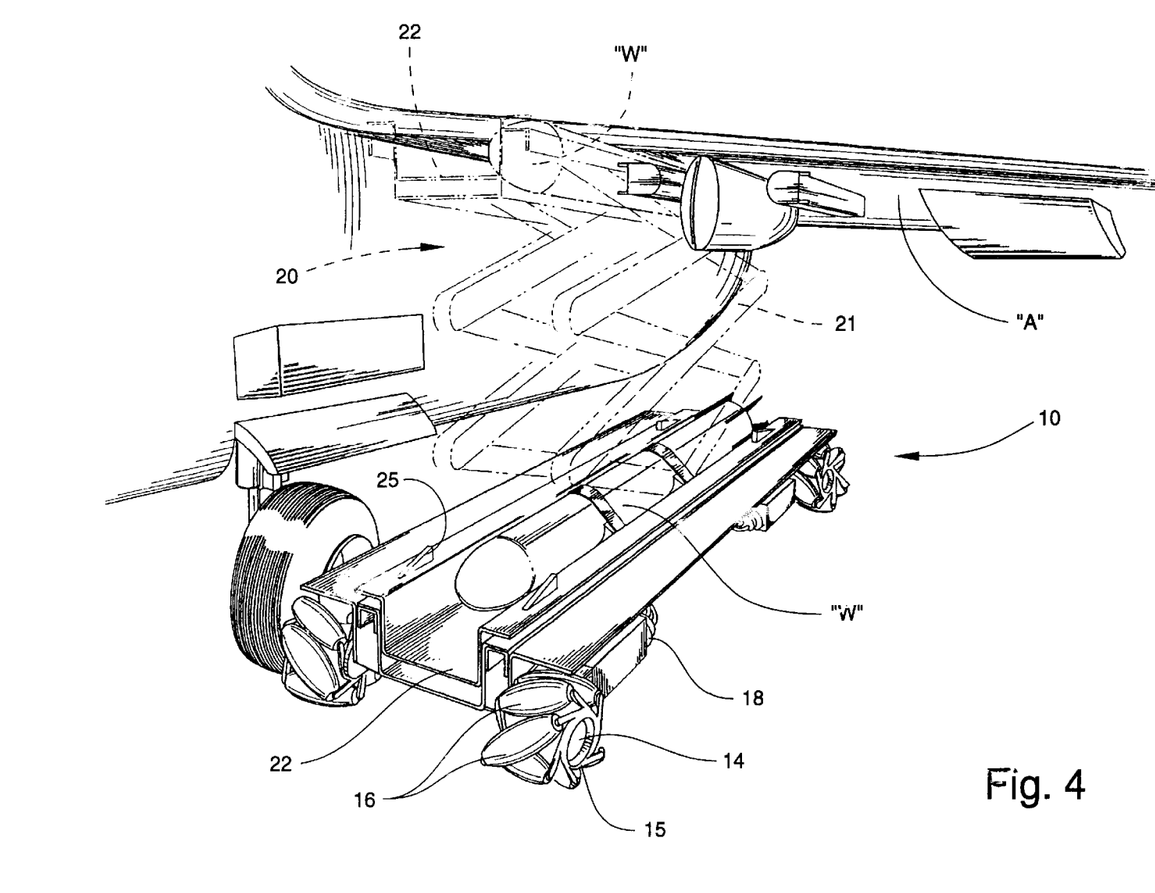
FIG. 4 is a perspective view illustrating movement of the munitions carrier between the weapons-transport position and the aircraft-access position.

A mechanical lift 20 is mounted on the platform chassis 12 of the vehicle 10, and includes a plurality of cooperating, interconnected, crossing arms 21. A removable weapons trough 22 is located at a top of the lift 20, and is adapted for holding aircraft weapons "W" in a prone "lying down" position. The weapons trough 22 includes flange openings 24 which align with respective anchors 25 to restrict forward and rearward movement of the trough 22 during operation of the vehicle 10. The scissor lift 20 is actuated either manually, using hydraulic, pneumatic, or electric motors, diesel power, or a hybrid combination. The scissor lift 20 moves the weapons trough 22 between a weapons-transport position, shown in FIGS. 2, 3, and 4, and an aircraft-access position, shown in phantom in FIG. 4. In the weapons-transport position, the lift 20 is sufficiently retracted adjacent the platform chassis 12 to facilitate transport of weapons "W" to and from the aircraft "A". The profile "P" of the vehicle 10 in this position is preferably less than 14 inches as measured from an uppermost extremity of the vehicle 10 to the ground. In the aircraft-access position, the lift 20 is sufficiently extended to enable precision loading and unloading of weapons "W" in the aircraft "A" without repositioning or reconfiguring the aircraft "A". The maximum reach "R" of the vehicle 10 in this position is preferably greater than 60 inches as measured from the weapons trough 22 to the ground. The vehicle 10 is able to perform loading and unloading for all munitions in or out of containers, racks, launchers, adapters, etc. weighing up to 6,000 pounds, and preferably 7,000 pounds on all weapons stations of current fighter, bomber, attack, unmanned combat aerial vehicle and rotary-wing aircraft.

Preferably, the vehicle operator operates the mechanical lift 20 from controls located at a seated position on the platform chassis 12 and alternate controls located on the lift itself. The vehicle 10 has a remote control unit capable of controlling all lift functions, in addition to all vehicle movements and speed. The remote control unit does not present a danger from RF signals during operations involving exposed Electro-Explosive Devices and the system is safe from interference from outside sources.

Figure 5:
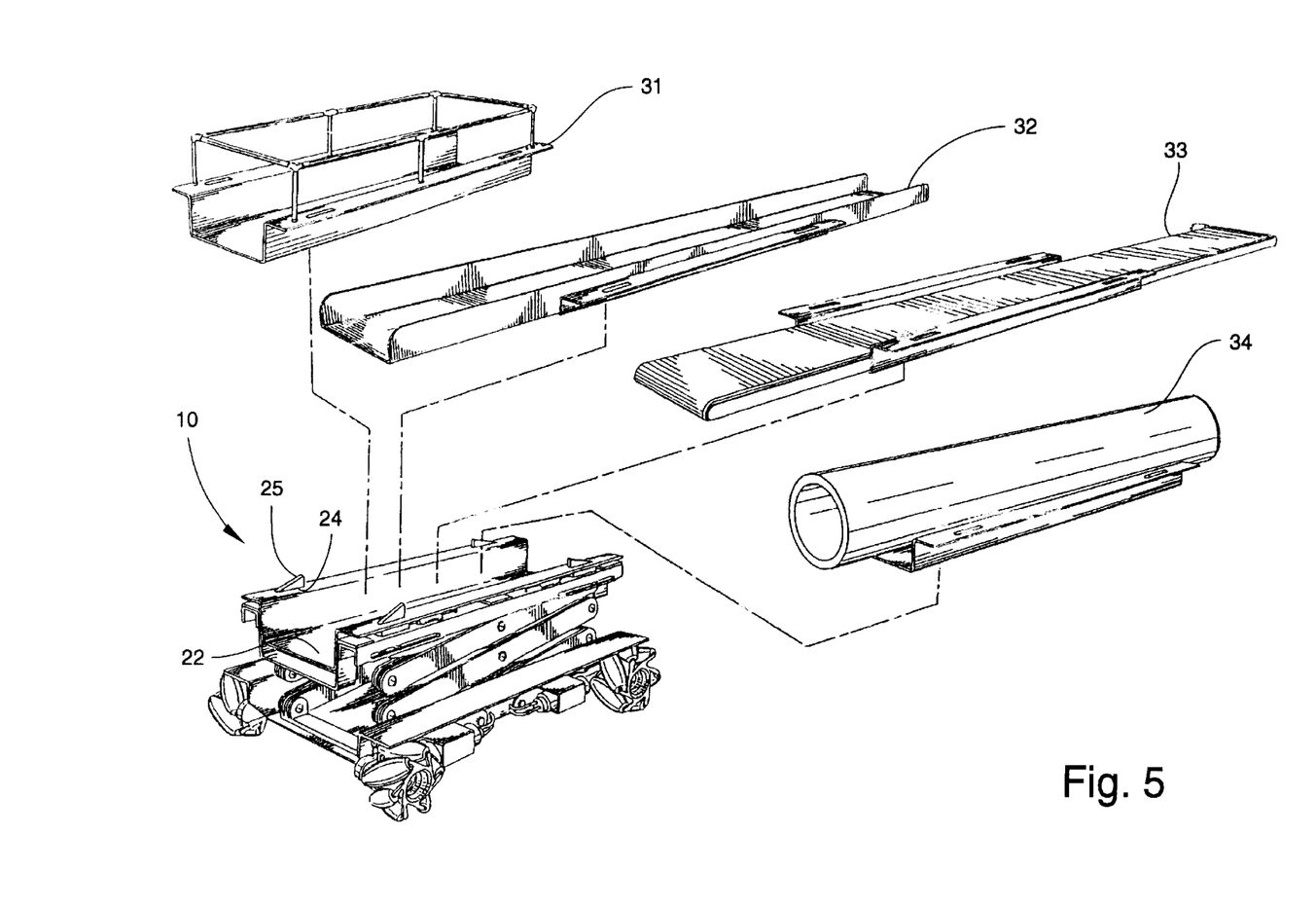
FIG. 5 is a perspective view showing various carrier accessories adapted for placement on the munitions carrier of the vehicle.
Figure 6:
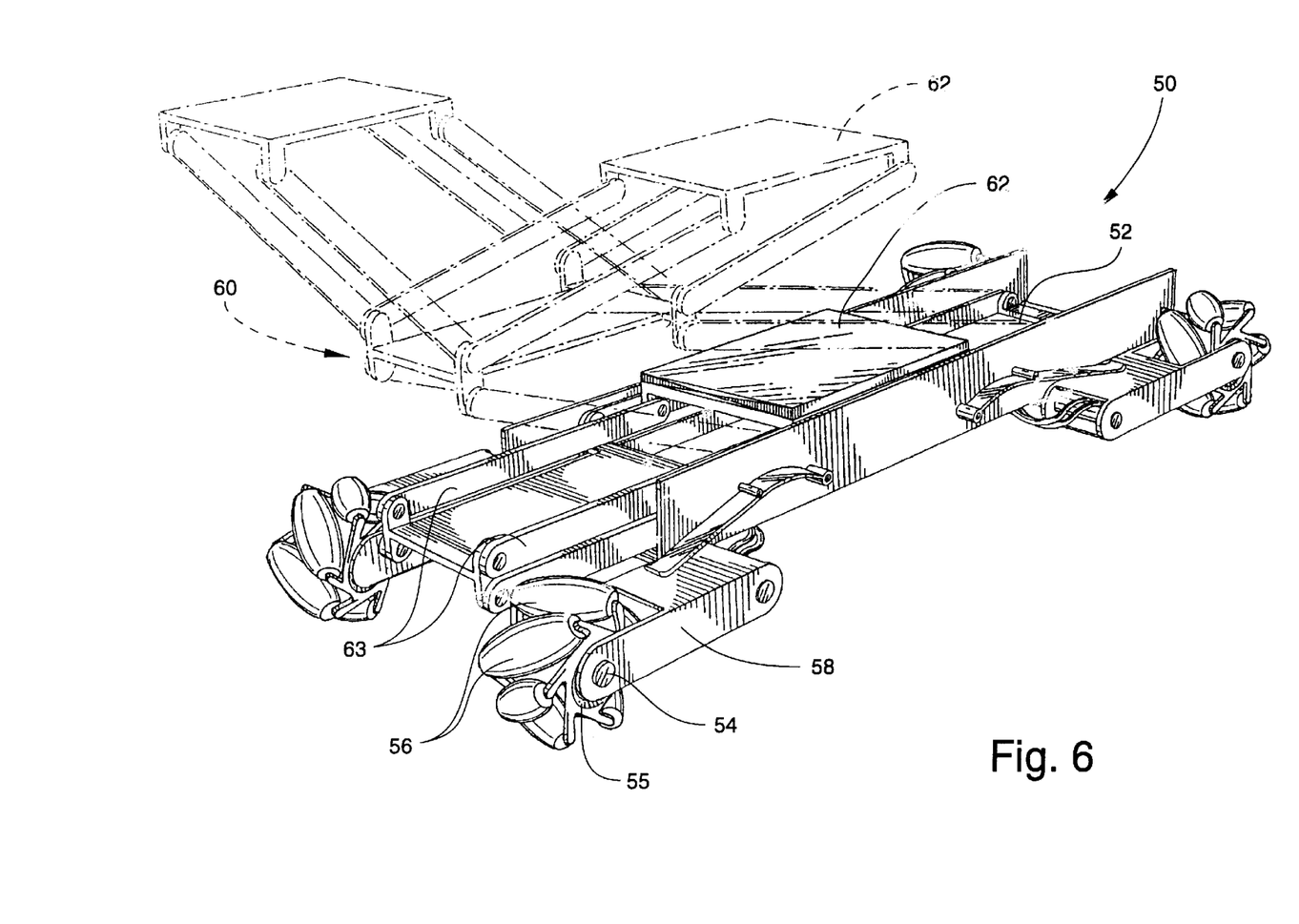
FIG. 6 is perspective view of a munitions handling vehicle according to a second preferred embodiment of the invention, and showing the foldable stand in folded and partially unfolded conditions.
Figure 7:
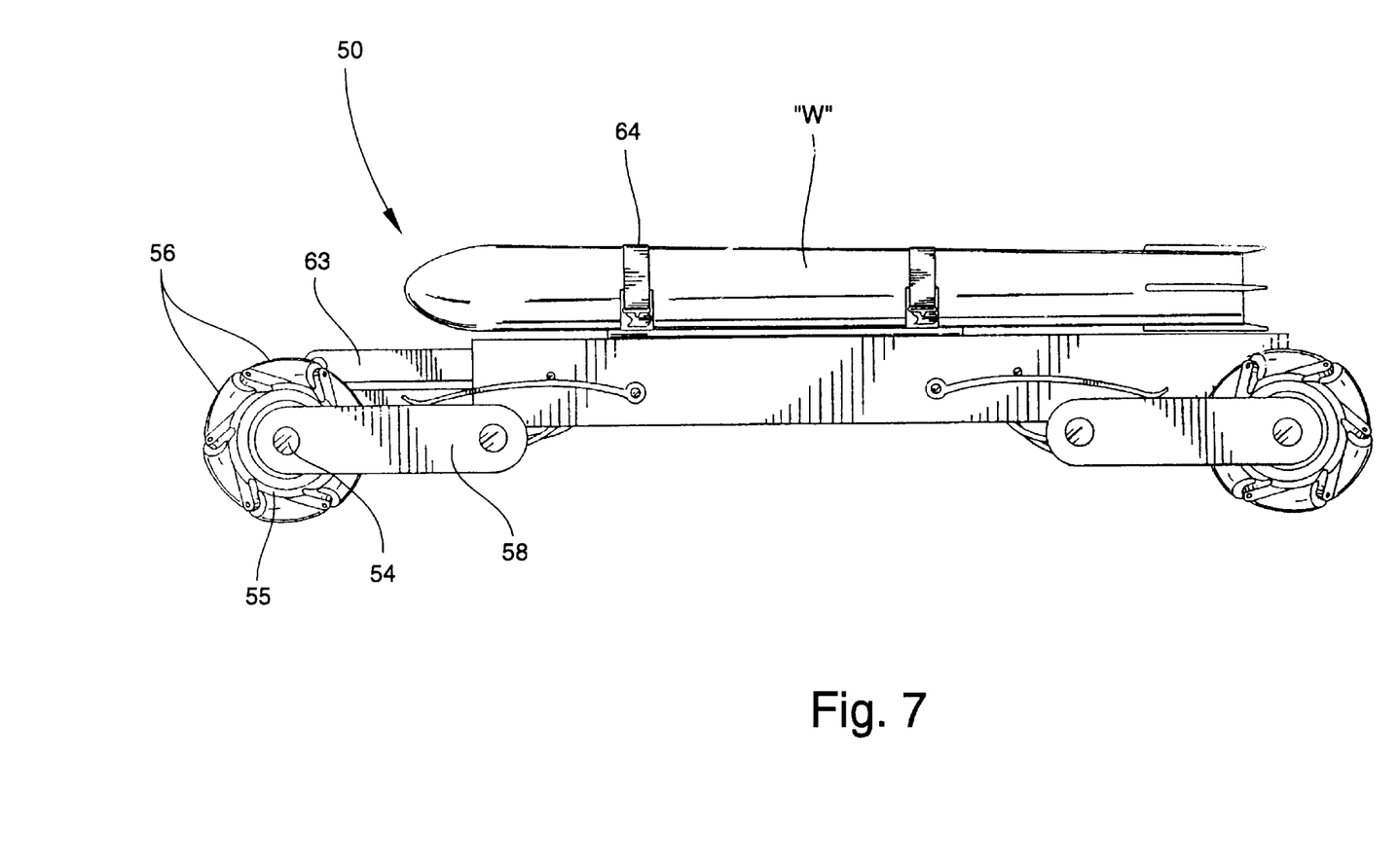
FIG. 7 is a side elevation of the munitions handling vehicle with the munitions carrier in the weapons-transport position, and showing an aircraft weapon in a prone position on the carrier.
Figure 8:
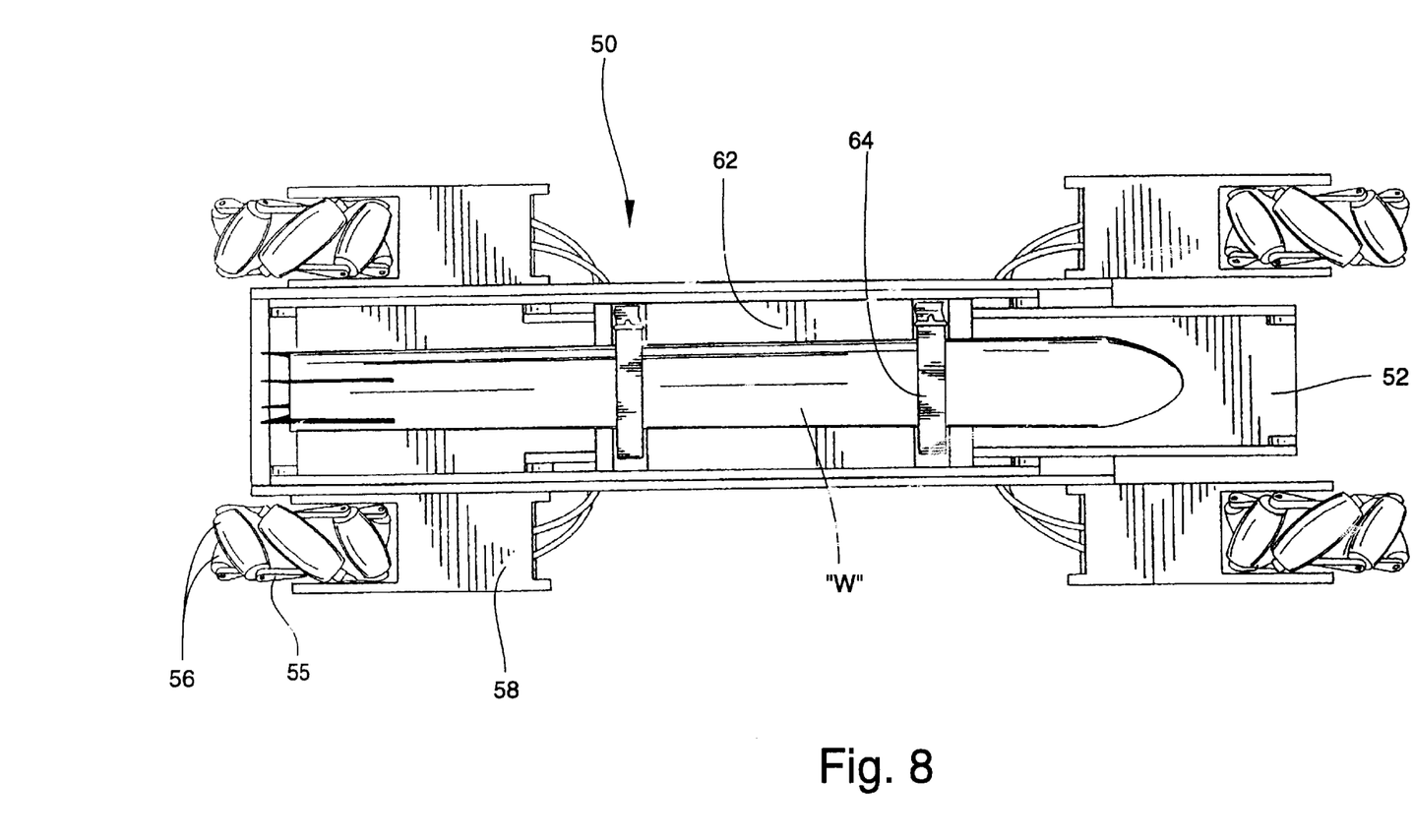
FIG. 8 is a top plan view of the munitions handling vehicle.
Figure 9:
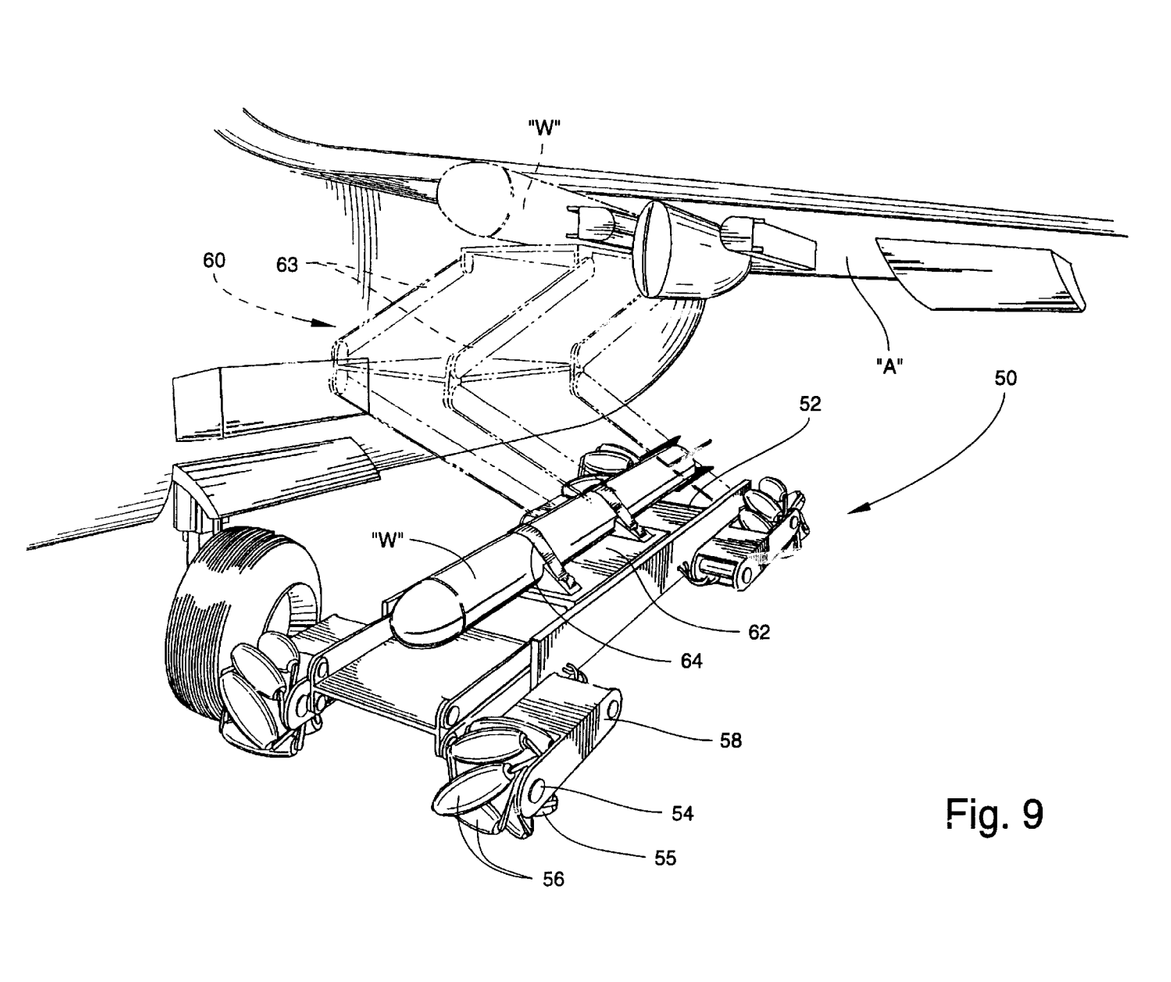
FIG. 9 is a perspective view illustrating movement of the munitions carrier between the weapons-transport position and the aircraft-access position.

As shown in FIG. 5, the vehicle 10 may incorporate a number of removable carrier accessories 31, 32, 33, and 34 adapted for placement directly on the weapons trough 22, and applicable for holding a wide variety of aircraft munitions. The accessories include respective flange openings, such as flange openings 24 of the weapons trough, adapted to align and mate with anchors 25.

Referring to FIGS. 6–9, a second embodiment of a munitions handling vehicle 50 includes a platform chassis 52 and wheel axles 54 carrying respective omni wheels 55. Each omni wheel 55 includes a series of six passive elliptical rollers 56 each mounted at a 45-degree angle to the wheel plane of rotation. Four identical, 5-horsepower AC electric motors 58 are operatively connected to respective drive units to enable independent actuation of the omni wheels 55. Using conventional RF technology, vehicle speed and direction are remote-controlled by a three-axis joystick (not shown). Responding to the joystick, microprocessor-based algorithms control the rate and direction of rotation of each wheel 55 to achieve the desired vehicle motion.

A mechanical lift 60 is mounted on the platform chassis 52 of the vehicle 50, and includes a collapsible weapons stand 62 and a plurality of cooperating, interconnected, folding arms 63. The weapons stand 62 has mounting straps 64 adapted for extending around and holding aircraft weapons "W" in a prone "lying down" position during operation of the vehicle 50. The lift 60 is actuated either manually, using hydraulic, pneumatic, or electric motors, diesel power, or a hybrid combination. The lift 60 moves the weapons stand 62 between a weapons-transport position, shown in FIGS. 7, 8, and 9, and an aircraft-access position, shown in phantom in FIG. 9. In the weapons-transport position, the lift 60 is sufficiently retracted adjacent the platform chassis 52 to facilitate transport of weapons "W" to and from the aircraft "A". The profile "P" of the vehicle 50 in this position is preferably less than 14 inches as measured from an uppermost extremity of the vehicle 50 to the ground. In the aircraft-access position, the lift 60 is sufficiently extended to enable precision loading and unloading of weapons "W" in the aircraft "A" without repositioning or reconfiguring the aircraft "A". The maximum reach "R" of the vehicle 50 in this position is preferably greater than 60 inches as measured from the weapons stand 62 to the ground.

A munitions handling vehicle is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A munitions handling vehicle adapted for loading and unloading weapons in military aircraft, said munitions handling vehicle comprising:
   (a) a vehicle chassis;
   (b) a plurality of wheel axles attached to said vehicle chassis;
   (c) a plurality of omni wheels mounted on respective wheel axles and cooperating to induce omni-directional movement of said vehicle;
   (d) a mechanical lift supported by said vehicle chassis; and
   (e) a munitions carrier secured to a top end of said lift, and comprising an elongated trough adapted for holding weapons in a generally prone position, said munitions carrier being movable upon actuation of said lift between a weapons-transport position and an aircraft-access position, such that:
      i. in the weapons-transport position, said lift is sufficiently retracted adjacent said vehicle chassis to facilitate transport of weapons in said carrier to and from the aircraft; and
      ii. in the aircraft-access position, said lift is sufficiently extended to enable precision loading and unloading of weapons in the aircraft without repositioning or reconfiguring the aircraft.

2. A munitions handling vehicle according to claim 1, wherein each of said omni wheels comprises a plurality of generally elliptical-shaped rollers.

3. A munitions handling vehicle according to claim 2, wherein each of said omni wheels comprises at least six of said rollers.

4. A munitions handling vehicle according to claim 1, and comprising an electric motor operatively connected to each of said omni wheels for actuating said wheels.

5. A munitions handling vehicle according to claim 4, wherein each electric motor comprises a minimum of 5 horsepower.

6. A munitions handling vehicle according to claim 1, wherein said mechanical lift comprises a scissor lift including a plurality of cooperating, interconnected, crossing arms.

7. A munitions handling vehicle according to claim 1, wherein said mechanical lift comprises a collapsible weapons stand including a plurality of cooperating, interconnected, folding arms.

8. A munitions handling vehicle according to claim 1, wherein said vehicle chassis comprises a support platform.

9. A munitions handling vehicle according to claim 1, wherein said vehicle defines a profile measured from an uppermost extremity of said vehicle to a ground surface, said profile being less than 14 inches when said mechanical lift is fully retracted.

10. A munitions handling vehicle according to claim 1, wherein said vehicle defines a maximum reach measured from said munitions carrier to a ground surface, said maximum reach being greater than 60 inches when said mechanical lift is fully extended.

11. A munitions handling vehicle adapted for loading and unloading weapons in military aircraft, said munitions handling vehicle comprising:
    (a) a vehicle chassis;
    (b) a plurality of wheel axles attached to said vehicle chassis;
    (c) a plurality of omni wheels mounted on respective wheel axles and cooperating to induce omni-directional movement of said vehicle;
    (d) a mechanical lift supported by said vehicle chassis; and
    (e) a munitions carrier secured to a top end of said lift, and movable upon actuation of said lift between a weapons-transport position and an aircraft-access position, such that:
       i. in the weapons-transport position, said lift is sufficiently retracted adjacent said vehicle chassis to facilitate transport of weapons in said carrier to and from the aircraft; and
       ii. in the aircraft-access position, said lift is sufficiently extended to enable precision loading and unloading of weapons in the aircraft without repositioning or reconfiguring the aircraft; and
    (f) said munitions handling vehicle defining a profile measured from an uppermost extremity of said vehicle to a ground surface, said profile being less than 14 inches when said mechanical lift is fully retracted.

12. A munitions handling vehicle adapted for loading and unloading weapons in military aircraft, said munitions handling vehicle comprising:
    (a) a vehicle chassis;
    (b) a plurality of wheel axles attached to said vehicle chassis;
    (c) a plurality of omni wheels mounted on respective wheel axles and cooperating to induce omni-directional movement of said vehicle;
    (d) a mechanical lift supported by said vehicle chassis; and
    (e) a munitions carrier secured to a top end of said lift, and movable upon actuation of said lift between a weapons-transport position and an aircraft-access position, such that:

i. in the weapons-transport position, said lift is sufficiently retracted adjacent said vehicle chassis to facilitate transport of weapons in said carrier to and from the aircraft, and in the weapons-transport position, said vehicle defines a profile of less than 14 inches measured from an uppermost extremity of said vehicle to a ground surface; and ii. in the aircraft-access position, said lift is sufficiently extended to enable precision loading and unloading of weapons in the aircraft without repositioning or reconfiguring the aircraft, and in the aircraft-access position, said vehicle defines a maximum reach of greater than 60 inches measured from said munitions carrier to the ground surface.

13. A munitions handling vehicle according to claim 12, wherein each of said omni wheels comprises a plurality of generally elliptical-shaped rollers.

14. A munitions handling vehicle according to claim 13, wherein each of said omni wheels comprises at least six of said rollers.

15. A munitions handling vehicle according to claim 12, and comprising an electric motor operatively connected to each of said omni wheels for actuating said wheels.

16. A munitions handling vehicle according to claim 15, wherein each electric motor comprises a minimum of 5 horsepower.

17. A munitions handling vehicle according to claim 12, wherein said mechanical lift comprises a scissor lift including a plurality of cooperating, interconnected, crossing arms.

18. A munitions handling vehicle according to claim 12, wherein said mechanical lift comprises a collapsible weapons stand including a plurality of cooperating, interconnected, folding arms.

19. A munitions handling vehicle according to claim 12, wherein said vehicle chassis comprises a support platform.

20. A method for loading weapons in military aircraft, comprising the steps of:
   (a) transporting a weapon to an aircraft on a munitions handling vehicle, the vehicle comprising a plurality of omni wheels cooperating to induce omni-directional movement of the vehicle;
   (b) with the vehicle located at the aircraft, moving the weapon from a weaponstransport position, wherein the vehicle defines a profile of less than 14 inches measured from an uppermost extremity of the vehicle to a ground surface, to an aircraft-access position, wherein the vehicle defines a maximum reach of greater than 60 inches measured from the ground surface; and
   (c) in the aircraft-access position, loading the weapon in the aircraft.

* * * * *